Dec. 30, 1930.  H. E. BRANDT  1,786,889
SPRAYER
Filed June 6, 1927

Inventor
Henry E. Brandt
By
Attorney

Patented Dec. 30, 1930

1,786,889

UNITED STATES PATENT OFFICE

HENRY E. BRANDT, OF ST. PAUL, MINNESOTA, ASSIGNOR TO THE DOBBINS MANUFACTURING COMPANY, OF NORTH ST. PAUL, MINNESOTA, A CORPORATION OF SOUTH DAKOTA

SPRAYER

Application filed June 6, 1927. Serial No. 196,875.

The present invention relates to a spray mechanism.

In the spraying of insecticides it is desirable to have a spray mechanism which will accommodate mixtures of varying degrees of viscosity, and one which will cause an atomization of the spraying mixture directly upon the articles to be treated.

An object of the present invention is to make a spraying mechanism for liquid with means for adjusting the degree of atomization of the spraying mixture.

In order to attain this object, there is provided, in accordance with one feature of the invention, a tank having a pressure pump associated therewith to create a required pressure upon spraying liquid contained within said tank with means for conducting said spraying mixture under pressure to a spray nozzle, and having an air atomizing mechanism associated with said nozzle to assist in the atomization of the spraying mixture carried by said tank.

These and other features of the invention will be more fully brought out in the following description and the accompanying drawings, wherein.

Figure 2:
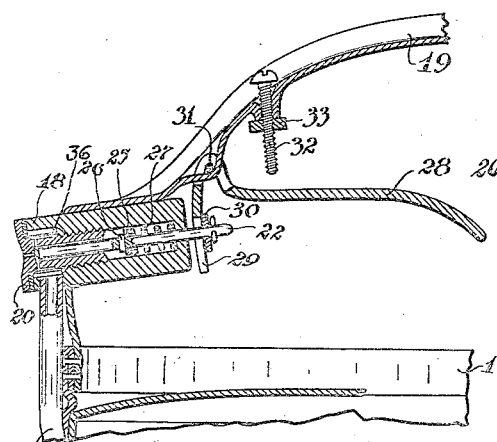
Figure 2, is a view in longitudinal section through the spray nozzle of the device and associated parts in operated position.
Figure 1:
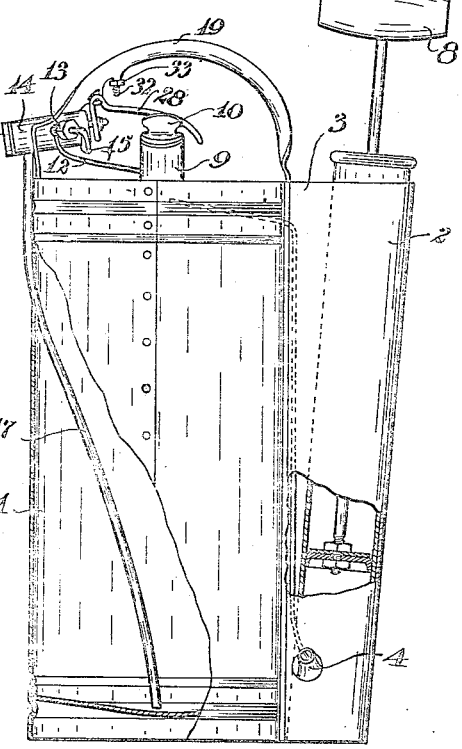
Figure 1, is a view in side elevation of the device, portions thereof being broken away to show the structure thereof.

Referring to the drawings in detail, a tank 1 is provided with an air pressure pump 2 secured adjacent a side thereof by means of a casing 3 which surrounds the pump and is riveted or otherwise securely fastened to the wall of the tank 1. A check valve 4, having a ball 5 mounted therein, is connected to the base of the pump 2, the ball 5 being arranged to normally seal the valve aperture 6 and to be raised therefrom by the incoming air from the pump 2. From the check valve an air tube 7 passes upwardly along the outside of the tank and in through an opening in the side of the tank from whence it passes to the center of the tank near the top thereof. To produce air pressure upon the spraying liquid contained within said tank, the pump is actuated by means of the handle 8.

An air pressure compartment 9 projects above the top of the tank to be in open communication therewith and is closed by a threaded cap member 10 having a washer 11 to form an air tight seal between the cap 10 and the air pressure compartment 9. An air tube 12 is connected to communicate with the interior of the compartment 9 and with a needle valve 13 which controls the admission of air into the spraying nozzle 14. The needle valve 13 is adjusted by a handle 15, a packing nut 16 being provided to secure an air tight seal between the needle valve 13 and the handle 15. A liquid conducting tube 17 is connected to the spraying nozzle 14, said tube passing through the wall of the tank and extending to a point near the bottom of the tank to provide a passage for the contents of the tank to the spraying nozzle.

The spraying nozzle comprises a casing 18 securely connected to a carrying handle 19, the casing having a spraying jet member 20 threadedly inserted therein. The spraying jet member is provided with a central opening 21 within which a plunger 22 is slidably mounted. The plunger is provided with a leather closure plug 23 secured to the end thereof to seal a small aperture 24 in the spraying jet member 20 through which the liquid from the tank is ejected. The plunger 22 is provided with a washer 25 secured thereto by a key 26, the plunger being normally held in a closed position by means of a coil spring 27 which surrounds the plunger, and rests against the washer 25, the other end of the spring being supported against the end of the casing 18. An actuating lever 28 has a forked end 29 which engages a washer 30 secured to the outer end of the plunger 22, the actuating lever being pivotally connected to the carrying handle 19 by means of a pin 31. An adjusting screw 32 is threadedly mounted in a portion of the carrying handle to adjustably limit the movement of the actuating lever and is provided with a lock nut 33 to lock the screw 32 in an adjusted position. The spraying jet 20 has a pair of apertures 34 and 35 communicating between the outer surface thereof and the central opening in which the plunger 22 is inserted. A tubular screen 36 surrounds the spray nozzle to prevent the entrance of solid material into the spraying jet to clog it. The openings in this tubular screen are preferably somewhat smaller than the jet opening so that any material passing this screen should be free to pass the jet opening. This screen requires but infrequent inspection and cleaning, since even though most of the apertures therein are clogged, as long as a few of said apertures are open there will be a sufficient flow of the spraying liquid to adequately supply the spraying nozzle.

To operate the device the pump is actuated by means of the handle 8 to create a required pressure within the tank 1 which tends to force the liquid spraying material within the tank 1 through the liquid supply tube 17 to the spraying nozzle and simultaneously to force air through the tube 12. The air discharge is regulated by the needle valve handle member 15, while the discharge of spraying material is controlled by the adjusting screw 32. Upon the attainment of a required pressure within the tank and the adjustment of the needle valve 13 to control the amount of air to be admitted to the spraying nozzle, the actuating lever 28 may be moved by the hand of the person carrying the device to withdraw the plunger 22 from its position over the opening 24 in the spraying jet member which causes the ejection of a spray of mist from the spray nozzle. The apertures 34 and 35, being arranged substantially tangent to the aperture 21 within the spraying jet member, cause a whirling motion to be imparted to the liquid entering the spraying jet member, and, where air is admitted by means of the needle valve 13 the whirling particles are still further broken up by the air current from the needle valve.

Figure 3:
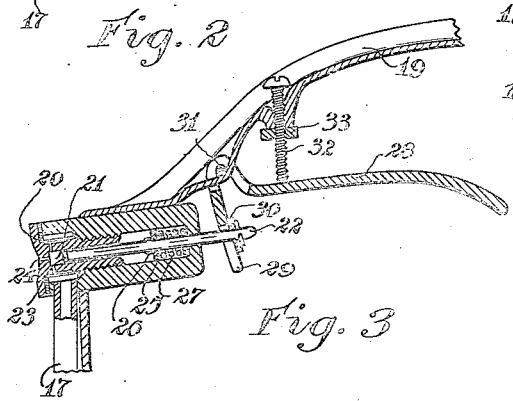
Figure 3, is a view similar to Figure 2, showing the parts in an operated position.
Figure 7:
Figure 7, is a perspective view of a strainer.
Figures 4, 5:
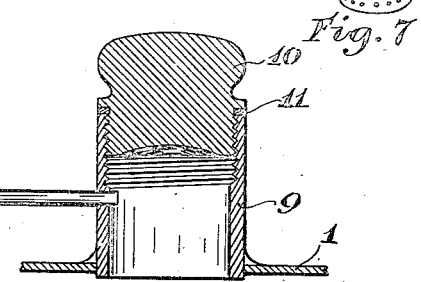
Figure 4, is a sectional view through an air inlet which assists in the atomization of the spraying substance.
Figure 5, is a view in transverse section through a portion of the spraying nozzle.
Figure 6:
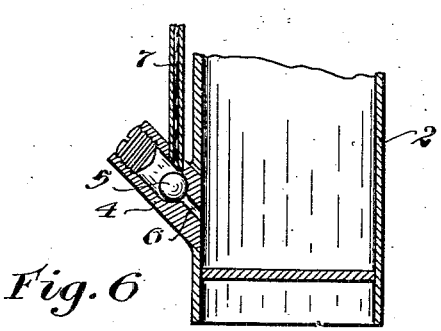
Figure 6, is a view in transverse vertical section through the base of the pressure pump showing a pressure controlling valve.

The degree to which the plunger is withdrawn is of significant importance in controlling the spray discharged through the spray nozzle, since most heavy spraying liquids are sprayed more effectively with the plunger 22 withdrawn only a slight distance from its seat and with a comparatively large amount of air admitted through the needle valve 13, since in this condition the mixture is ejected with a comparatively large admixture of air and with a powerful whirling action. This is probably due to the fact that the spraying liquid, entering the tangential apertures 34 and 35 does not have an opportunity to expand and settle in the central opening 21 of the spraying jet member, but is at once ejected while still retaining a powerful whirling motion. Lighter mixtures are usually found to spray more effectively with the plunger withdrawn to a greater distance, as shown in Figure 3, and with the amount of air introduced through the needle valve 13 reduced, or shut off entirely. The adjustment of the degree of withrawal of the plunger and the amount of air admitted through the needle valve may be determined by the user to suit the requirements of the individual user.

There is thus provided a spraying mechanism which can readily and effectively employ a widely varying range of liquids with means for easily adjusting the spray to suit the needs of the occasion.

I claim:

A spraying apparatus having in combination, a tank adapted to contain the liquid to be sprayed and air under pressure, a discharge nozzle carried by said tank, comprising a body having a removable plug in its front end with a small central aperture and a central bore extending rearwardly from said aperture, an annular chamber about said plug, said plug having passages substantially tangential to said bore connecting said bore and chamber, a plunger movable in said bore and of smaller diameter than said bore there being at all times a passage in said bore around said plunger throughout the length of said bore, means at the forward end of said plunger for closing said aperture, a chamber in the rear of said plug communicating at all times with said annular chamber about said plunger, a conduit leading from the liquid in said tank connected to said annular chamber, a conduit leading from the air space in said tank connected to said rear chamber and a valve in said last mentioned conduit for regulating the flow of air therethrough.

In testimony whereof I affix my signature.

HENRY E. BRANDT.